United States Patent

Rankin et al.

[11] Patent Number: 6,076,901
[45] Date of Patent: Jun. 20, 2000

[54] TRACK SHOE FOR AN ENDLESS TRACK VEHICLE

[76] Inventors: Mark T. Rankin, 234 S. 12th St.;
Wayne D. Whittaker, 830 Vermont;
David A. Kuhl, 2906 Cabot Rd., all of
Quincy, Ill. 62301

[21] Appl. No.: 08/964,767

[22] Filed: Nov. 5, 1997

[51] Int. Cl.⁷ .................................................. B62D 55/205
[52] U.S. Cl. ............................ 305/160; 305/46; 305/189;
305/192; 305/197; 305/198; 305/203
[58] Field of Search .............................. 305/160, 46, 189,
305/191, 192, 197, 198, 202, 203

[56] References Cited

U.S. PATENT DOCUMENTS

| | | | |
|---|---|---|---|
| 1,966,450 | 7/1934 | Knox | 305/160 |
| 2,332,976 | 10/1943 | Saurer et al. | 305/164 |
| 2,409,502 | 10/1946 | Leguillon et al. | 305/164 |
| 2,738,236 | 3/1956 | Haushalter | 305/163 |
| 3,231,316 | 1/1966 | Ruf | 305/189 |
| 3,357,750 | 12/1967 | Reynolds et al. | 305/189 |
| 3,542,439 | 11/1970 | Joos | 305/46 |
| 3,721,476 | 3/1973 | Andersson | 305/189 |
| 4,116,498 | 9/1978 | Borner | 305/189 |
| 4,262,972 | 4/1981 | Falk | 305/189 |
| 4,278,301 | 7/1981 | Gregor et al. | 305/198 |
| 4,425,007 | 1/1984 | Soeteber | 305/111 |
| 4,840,438 | 6/1989 | Cory | 305/160 |
| 5,388,900 | 2/1995 | Suzuki | 305/187 |
| 5,800,026 | 9/1998 | Nagata | 305/46 |

*Primary Examiner*—Russell D. Stormer
*Assistant Examiner*—Long Bao Nguyen
*Attorney, Agent, or Firm*—Ladas & Parry

[57] ABSTRACT

A shoe for an endless track has an internal frame with an elastomeric coating. The frame includes tubular supports to receive a pivot pin for interconnection of adjacent shoes. The pin is located within the tubular supports by elastomeric bushings that accommodate relative pivotal movement by torsional deflection.

17 Claims, 6 Drawing Sheets

TRACK SHOE FOR AN ENDLESS TRACK VEHICLE

The present invention relates to tracks for tracked vehicles.

BACKGROUND OF THE INVENTION

Tracked vehicles are well known and use an endless track to support a vehicle on the ground. Conventionally, such a track is formed from a plurality of shoes arranged in seriatim and entrained around a pair of sprockets. Typically, idlers are provided between the sprockets to provide additional support for the track. In some cases, the track may be utilized in conjunction with a conventional wheel vehicle so that the wheel of the vehicle becomes a drive sprocket and an additional idler or tension wheel is provided at a location spaced from the wheel. It is also known to utilize tracks simply entrained about the circumference of a wheel to provide an increased footprint for the wheel which consequently reduces ground pressure.

The shoes that form the track are connected to one another by hinge pins that allow limited pivotal movement or articulation between adjacent shoes. The axis for articulation is transverse to the direction of motion of the vehicle, i.e. parallel the axis of rotation of the drive sprockets. Conventionally, the shoe is formed from a steel forging or fabrication and the hinge pins utilize a bearing system to accommodate relative movement between the shoes. These bearing arrangements maybe roller bearings or, more typically, are metal bushings that accommodate relative rotation between the pin and the shoe and as such require seals. The tracks have to operate in hostile environments and, accordingly, wear on the bearings and failure of the seals is a significant problem.

A further problem encountered with conventional tracks is the damage that may be incurred through using a metal track on an asphalt or concrete. The action of the shoes is relatively aggressive and may cause permanent damage to such a surface. Moreover, the metal shoes are noisy in operation.

It is therefore an object to the present invention to provide a track and a shoe for such a track that obviates or mitigates the above disadvantages.

SUMMARY OF THE INVENTION

In general terms, the present invention provides a shoe for a tracked. The shoe has an internal frame with a resilient coating covering the frame. The frame includes a pair of spaced pivot members to receive respective hinge pins and maintained in spaced parallel relationship by a support plate.

Preferably, a former is secured to the support plate and projects to one side of the support plate to define a tooth.

Preferably, the resilient coating is a rubber, either synthetic or natural, or a combination of both and ground engaging formations are molded into the resilient coating on the opposite side of the support plate to the former.

According to a further aspect of the invention, there is provided a endless track for a tracked vehicle. The track has a plurality of shoes connected in seriatim by hinge pins having a radially outwardly directed wall. The hinge pins permit articulation between adjacent shoes. Adjacent pairs of shoes have interrogated sections, each with tubular support. The support are aligned with one another to receive the hinge pin. Each of the supports has a radially inwardly directed wall spaced radially from the outwardly directed wall of the pin. A plurality of elastameric bushings extend between the pin and tubular support and are sewed to the walls to inhibit rotational displace of the bushing relative to the walls. Relative pivotal movement between adjacent shoes is accommodated by torsional deflection of the busing.

Preferably, the bushings are bonded to the pin and are an interference fit within the tubular supports to provide a frictional engagement with the walls of the tubular support.

BRIEF DESCRIPTION OF THE DRAWINGS

An embodiment to the invention will now be described by way of example only with reference to the accompanying drawings in which.

DESCRIPTION OF THE PREFERRED EMBODIMENTS

Figure 1:
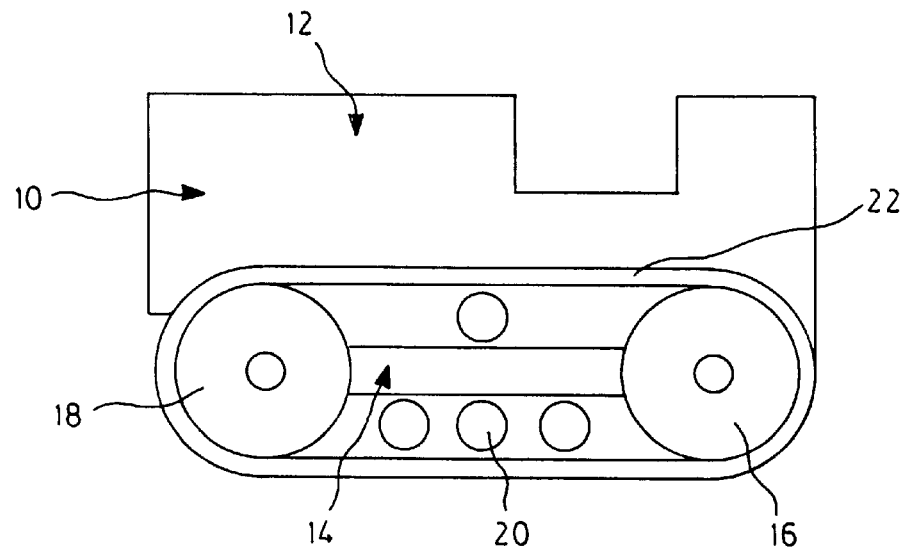
FIG. 1 is a side view of a tacked vehicle.

Referring, therefore, to FIG. 1, a tracked vehicle 10 includes a body 12 supported on an undercarriage 14. The undercarriage includes a drive sprocket 16, a driven sprocket 18 and a set of idlers 20. An endless track 22 is entrained about the sprocket 16, 18.

Figure 2:
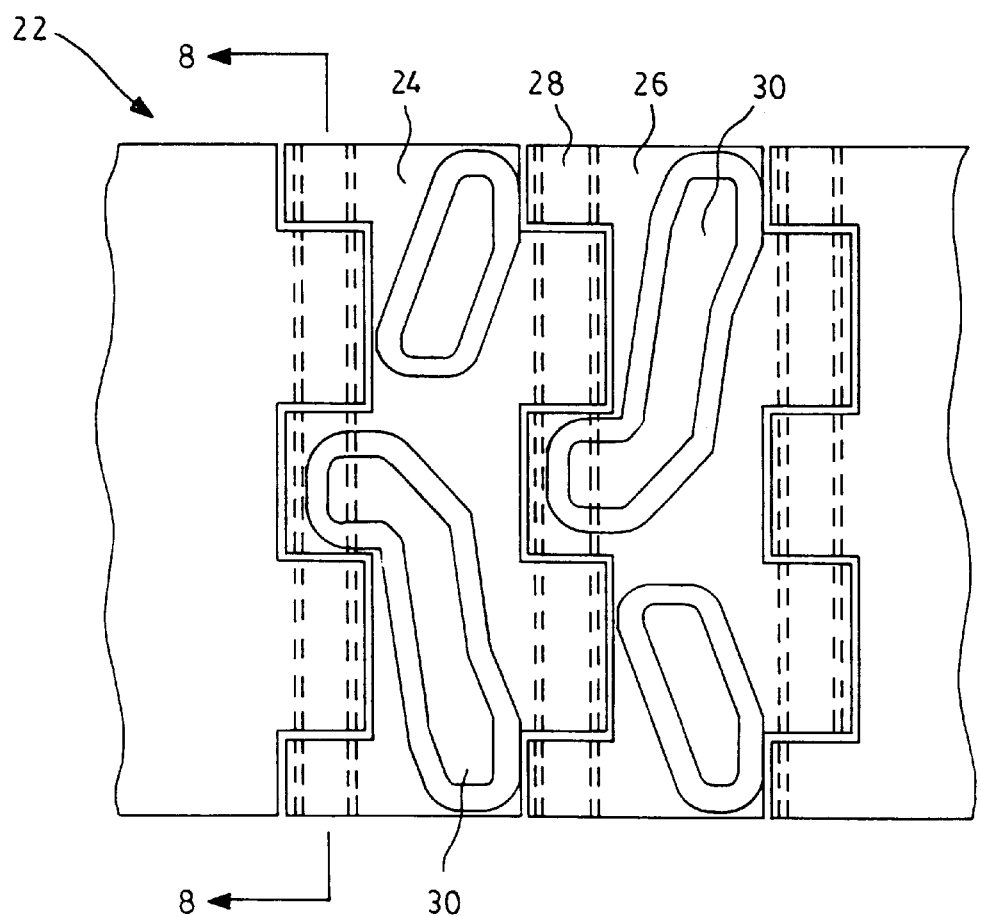
FIG. 2 is a plan view of a portion of the track of tie vehicle of FIG. 1.

The track 22 may best be seen in FIG. 2 and includes a plurality of shoes 24, 26, arranged in seriatim. The shoes 24, 26 are interconnected by a pin 28 in a manner to be described below to permit limited pivotal movement between the shoes.

Each of the shoes 24, 26 has ground engaging formations 30 formed on the outwardly directed surface and it will be noticed that the formations 30 are allochiral i.e. similar except for handedness, so that alternate left and right hand formation are provided to simulate a conventional traction tire pattern.

Figure 3:
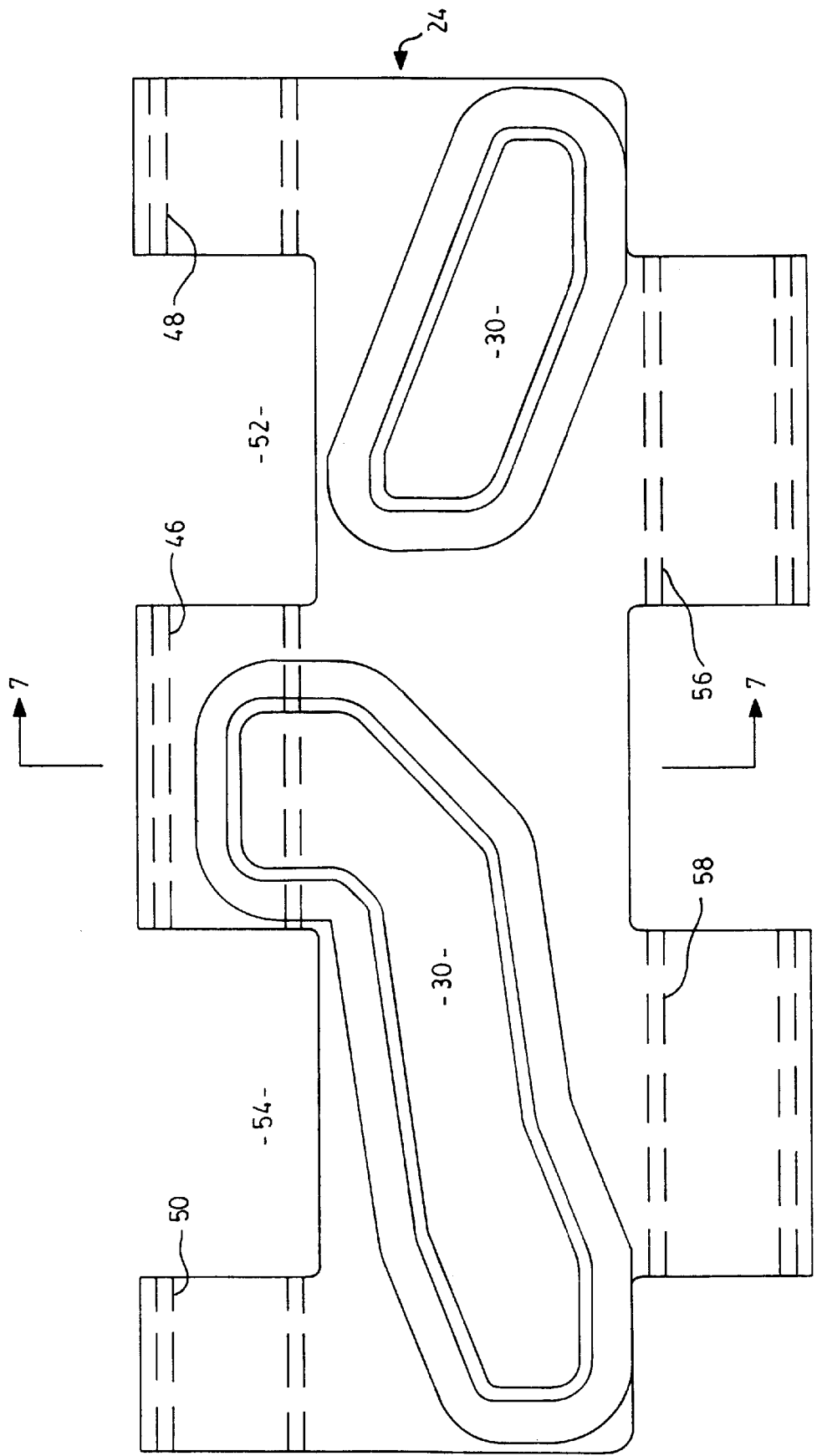
FIG. 3 is a plan view of a shoe used in the track of FIG. 2.
Figure 4:
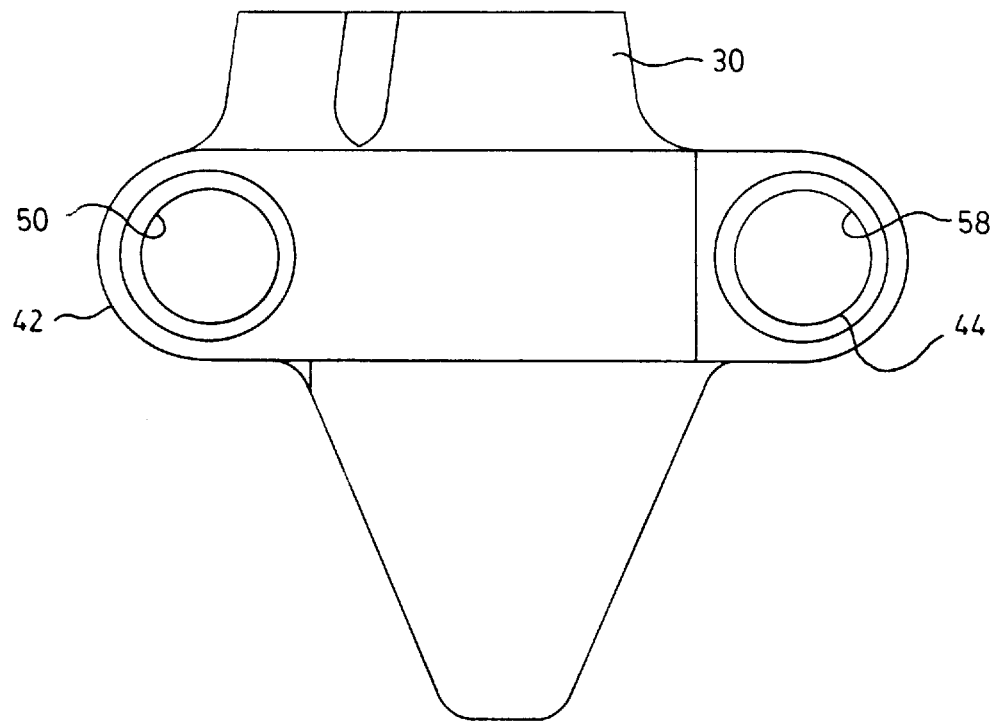
FIG. 4 is an end view of the shoe shown in FIG. 3.
Figure 7:
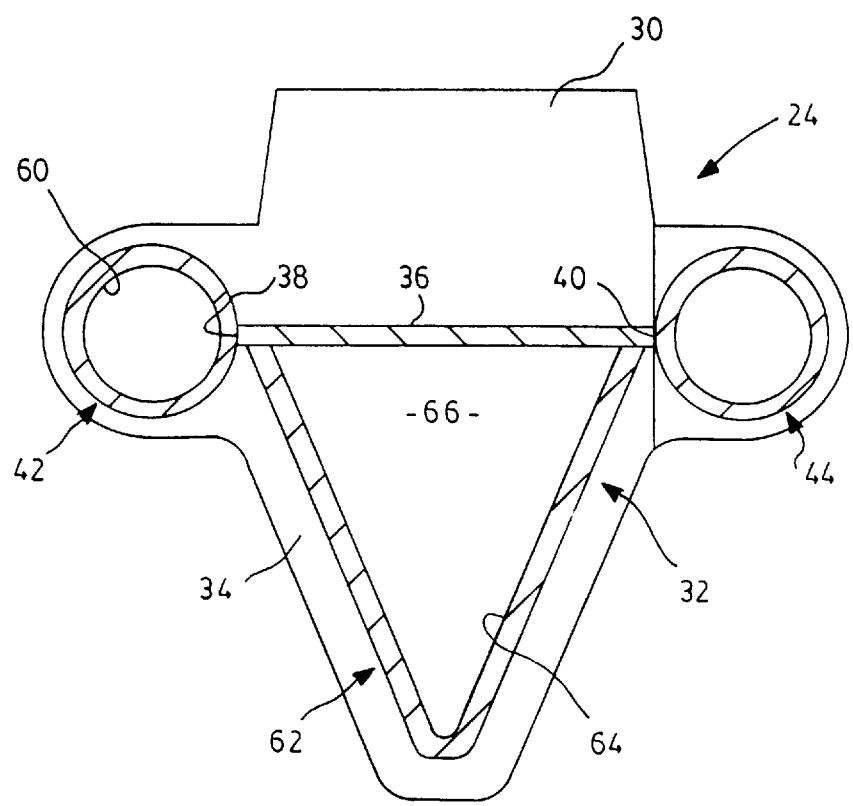
FIG. 7 is a view on the line 7—7 of FIG. 3.
Figure 5:
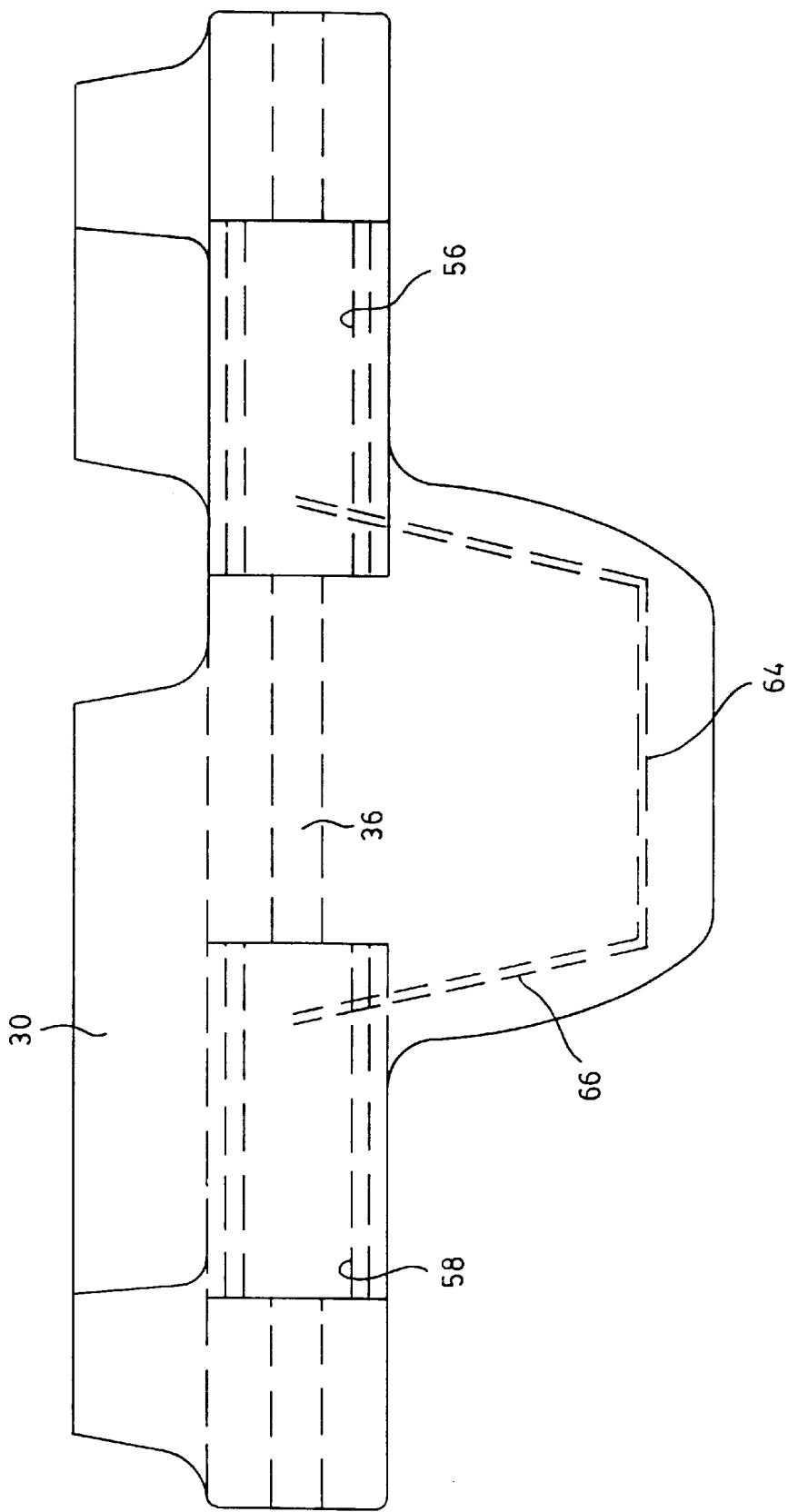
FIG. 5 is a front elevation of the shoe shown in FIG. 3.
Figure 6:
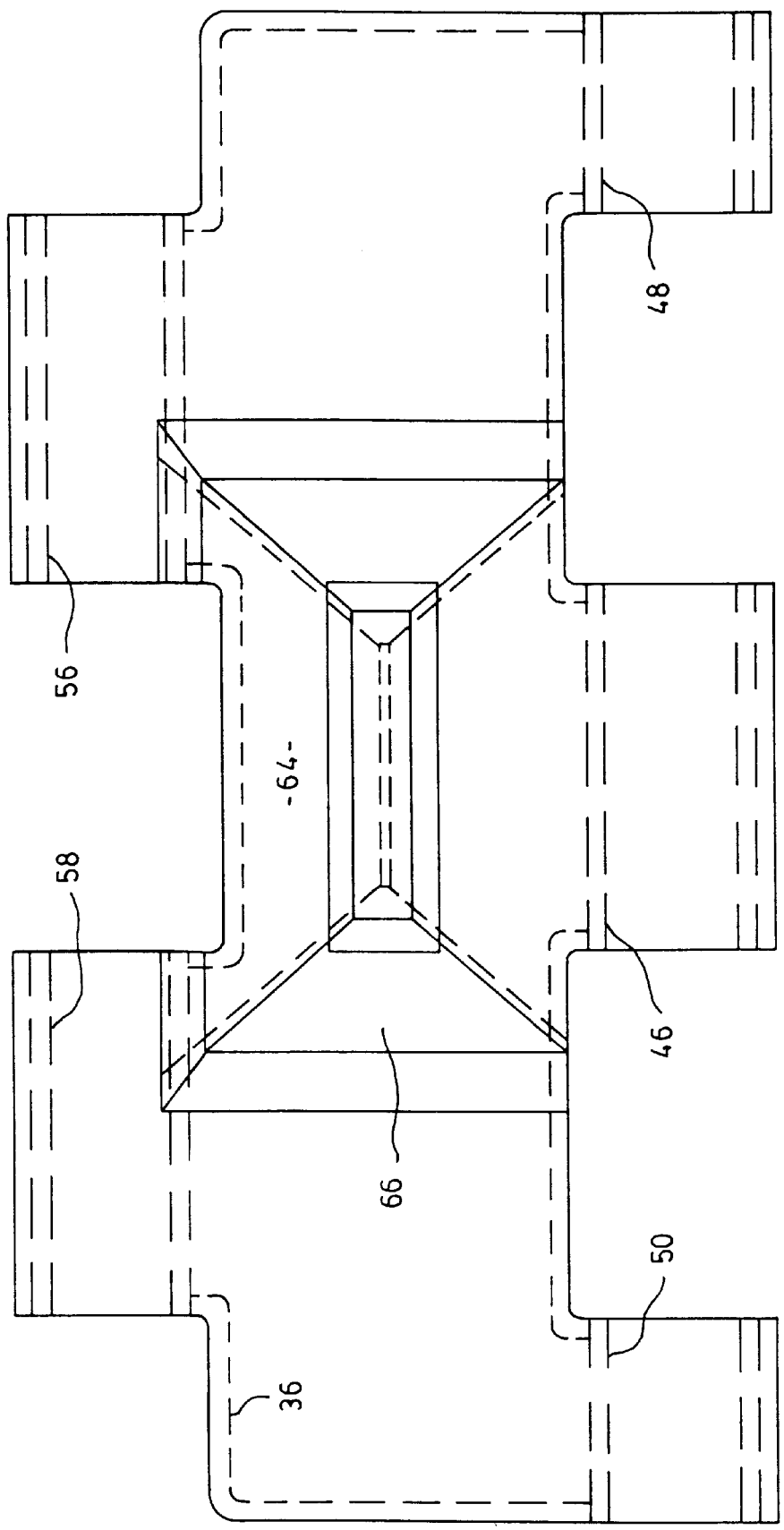
FIG. 6 is an underview of the shoe shown in FIG. 3.

As the shoes 24, 26 are similar, only one will be described in detail with reference to FIGS. 3 to 7. Referring firstly to FIGS. 3 and 7, the shoe 24 includes a frame 32 which is encased within a resilient coating 34. The frame 32 includes a rectangular plate 36 having oppositely directed edges 38, 40. Set of tubular support 42, 44 are secured to the edges 38, 40. One of the sets 42 provides a central tubular support 46 and a pair of lateral supports 48, 50 that are spaced from the central support 46 to define a pair of notches 52, 54.

The set 44 includes two tubular supports 56, 58 aligned with the notches 52, 54, respectively. As can readily be seen from FIG. 2 the offsetting of the sets of tubular support permits adjacent shoes to be arranged with the tubular supports interdigitated so that they may be aligned on a common axis to receive the pin 28.

Each of the tubular supports 46, 48, 50, 56, 58 has a radially inwardly directed wall 60.

A former 62 is welded to one side of the plate 36 to define a generally tooth-like projection. The former 62 has a V-shaped wall member 64 with end plates 66 (FIG. 5) to define an enclosed pyramidal body. The body is hollow and therefore reduces the weight of the shoe 24, 26.

The coating 34 is molded on to the frame 32 so as to fully encase the frame for the end faces of the tubular supports. Typically, the coating is an elastomeric material such as a combination of synthetic and natural rubbers and will typically have a thickness in the order of one-half inch over the former 62 and plate 66. The thickness of the coating over the tubular supports 42, 44, 46, 56, 58 is typically in the order of one-quarter inch to reduce the bulk. Obviously, the thickness of the molding for the ground engaging formations will vary according to the design of formation utilized.

Figure 8:
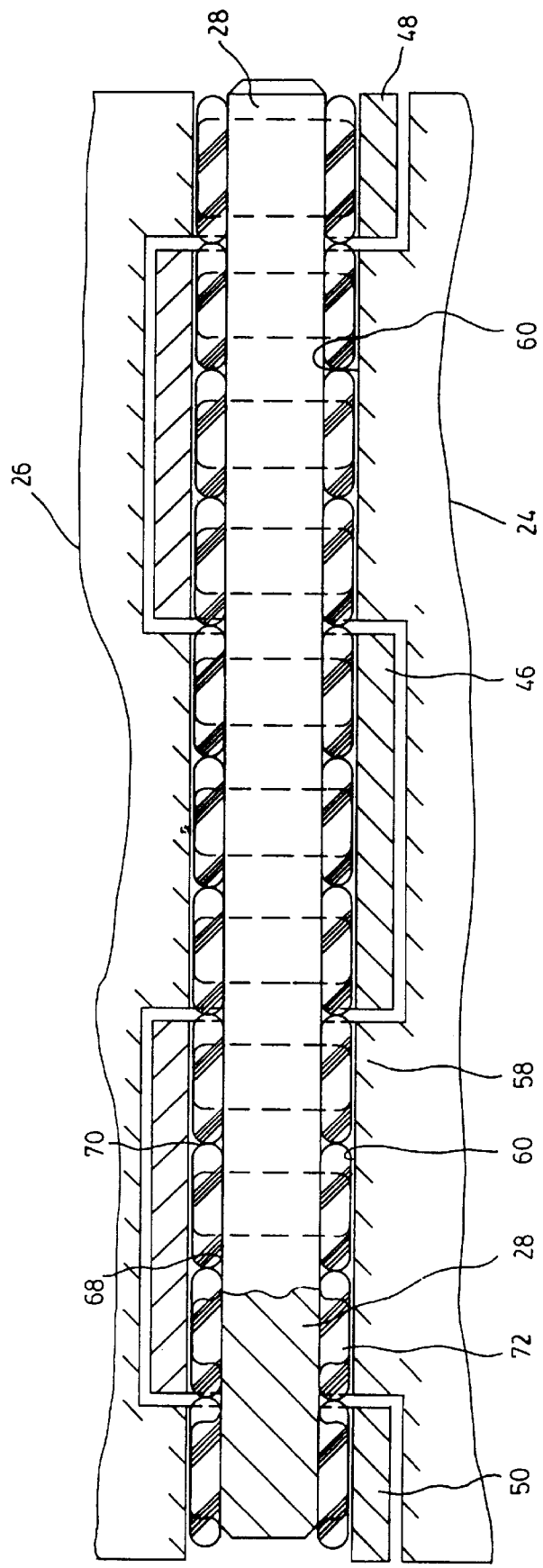
FIG. 8 is a view on th line 8—8 of FIG. 2.

The interconnection of the shoes 24, 26 by the pin 28 can best be seen in FIG. 8. The pin 28 is cylindrical and has a radially outwardly did surface 68. The diameter of the pin 28 is less than that of the tubular supports 46, 48, 50, 56, 58 so that there is an annular void 70 provided between the surfaces 60, 68. Annular bushings 72 are spaced apart along the pin 28 and are formed from an elastomeric material typically a combination of synthetic and natural rubbers. The bushings 72 are bonded to the radially outwardly directed surface 68 and, in a free body state, project beyond the radially inwardly directed wall 60. The bushings 72 thus provide an interference fit within the tubes. Typically, the difference in diameters between the free body bushing and the tubes is in the order of one-quarter inch and are dimensional such that displacement of material during insertion is sufficient to fill the void 70 completely. The pin 28 is pressed into the aligned tubes using a funnel and suitable to facilitate displacement of the rubber bushings and cause the bushing to frictionally engage the radially inwardly directed wall 60. Once installed, displacement between the bushing and the wall 60 is inhibited by the frictional engagement but relative rotation between adjacent shoes 24, 26 is accommodated by torsional deflection of the bushings 72. The deflection available from the bushings is sufficient to accommodate the rotation required for entrainment around the sprockets 16, 18 and thereby avoids the rotational movement between mechanical bearings.

The pin 28 can be removed utilizing a simple hydraulic or mechanical punch to facilitate maintenance in the field.

The provision of the annular bushings 62 avoids the need for lubrication and seals that a the same time provide radial and lateral location of the shoes on the pin to adequately define the axis of rotation between the shoes.

The inwardly directed tooth defined around the former 62 provides a positive drive with the sprockets although alterative structures and frictional drives may be utilized depending on the application. The encasement of the frame 32 in the resilient elastomeric material 34 provides a quiet operation and minimizes damage to the surface upon which it is operating.

We claim:

1. An endless track for a tracked vehicle, said track having a plurality of shoes connected in seriatim by hinge pins having a radially outwardly directed wall and permitting articulation between adjacent shoes, adjacent pairs of said shoes having interdigitated sections each with a set of tubular supports aligned with one another to receive said pin, each of said supports having a radially inwardly directed wall spaced radially from said outwardly directed walls of said pin, and a plurality of elastomeric bushings extending between said pin and each of said inward walls of said tubular supports, said bushing secured to each of said walls and pin to inhibit rotational displacement of said bushings relative to said walls, whereby relative pivotal movement between adjacent shoes is accommodated by torsional deflection of said bushing.

2. An endless track according to claim 1 wherein said bushings are bonded to said pin.

3. An endless track according to claim 2 wherein said bushings are an interference fit within said tubular supports to engage frictionally said radially inwardly directed wall.

4. An endless track according to claim 1 wherein each of said shoes has a resilient elastomeric coating.

5. An endless track according to claim 4 wherein each of said shoes has a frame including said tubular supports and said frame is encased by said elastomeric coating.

6. An endless track according to claim 5 wherein said frame includes a plate and said tubular supports are located on oppositely directed edges of said plate.

7. An endless track according to claim 6 wherein said frame includes a former projecting to one side of said plate, said former providing a drive too for engagement with a drive system of said vehicle.

8. An endless track according to claim 7 wherein said former is an enclosed pyramidal body.

9. An endless track according to claim 4 wherein ground engaging formations are molded in said elastomeric coating.

10. An endless track according to claim 4 wherein said coating is a rubber.

11. A track shoe having an internal frame and a resilient coating covering said frame, said frame including a pair of sets of tubular supports to receive a hinge pin and maintained in spaced parallel relationship by a support plate.

12. A track shoe according to claim 11 wherein a former is secured to said support plate to project to one side thereof.

13. A track shoe according to claim 12 wherein said former is a closed pyramidal body.

14. A track shoe according to claim 11 wherein said tubular supports of one of said sets are offset laterally relative to tubular supports of the other of sad sets.

15. A track shoe according to claim 11 wherein said coating is an elastomeric coating selected from the group of natural rubber, synthetic rubber and a combination thereof.

16. A track shoe according to claim 15 wherein ground engaging formations are molded in said coating.

17. An endless track shoe according to claim 3, wherein displacement of said elastomeric material of said bushings fills a void between said inward wall and said outward wall during insertion of said pin in said tubular supports.

* * * * *